Figure 1:
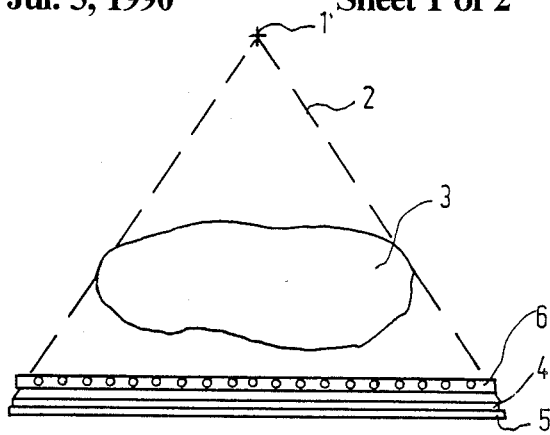

United States Patent [19]

Rupp et al.

[11] Patent Number: 4,939,759
[45] Date of Patent: Jul. 3, 1990

[54] METHOD OF PRODUCING AN X-RAY IMAGE BY MEANS OF A PHOTOCONDUCTOR, AND DEVICE FOR PERFORMING THE METHOD

[75] Inventors: Stephan G. Rupp, Stolberg; Ulrich Schiebel, Aachen, both of Fed. Rep. of Germany

[73] Assignee: U.S. Philips Corporation, New York, N.Y.

[21] Appl. No.: 347,552

[22] Filed: May 4, 1989

[30] Foreign Application Priority Data

May 19, 1988 [DE] Fed. Rep. of Germany ....... 3817027

[51] Int. Cl.$^5$ .............................................. B41M 5/00
[52] U.S. Cl. ........................................ 378/32; 378/28; 378/29
[58] Field of Search ..................................... 378/28-33

[56] References Cited

U.S. PATENT DOCUMENTS 4,752,944 6/1988 Conrads et al. ........................ 378/28

FOREIGN PATENT DOCUMENTS 0212733 1/1986 European Pat. Off. .
3529108 2/1987 Fed. Rep. of Germany .

Primary Examiner—Craig E. Church
Assistant Examiner—John C. Freeman
Attorney, Agent, or Firm—William Squire

[57] ABSTRACT

A method is disclosed for producing a X-ray image by a photoconductor which converts X-rays into a charge pattern and which is uniformly charged prior to the X-ray exposure and is discharged during the X-ray exposure as a function of the intensity of the X-rays, the surface of the photoconductor being scanned to measure the charge density, for each pixel point there being formed an image value which is dependent on the discharge at the relevant pixel whereby dot-shaped artefacts in the X-ray image may appear. These artefacts are substantially removed by measuring the position of the fault locations on the photoconductor, storing the position of the fault locations and the variations of the artefacts caused thereby in the vicinity of the fault locations; determining during subsequent X-ray exposures the amplitude of the artefact caused by the fault location from the image values at the position of the fault location and at the edge of a zone surrounding the fault location, calculating the variation of the artefact in the X-ray image in the surrounding zone from the amplitude and the stored variation, and correcting the X-ray image accordingly.

3 Claims, 2 Drawing Sheets

METHOD OF PRODUCING AN X-RAY IMAGE BY MEANS OF A PHOTOCONDUCTOR, AND DEVICE FOR PERFORMING THE METHOD

The invention relates to a method of producing an X-ray image by means of a photoconductor which converts X-rays into a charge pattern and which is uniformly charged prior to the X-ray exposure and is discharged during the X-ray exposure as a function of the intensity of the X-rays, its surface being scanned in order to determine the charge density, for each pixel there being formed an image value which depends on the discharge at the relevant pixel, and also relates to a device for performing such a method.

A method and a device of this kind are known from DE-OS 35 29 108 as well as from the references cited therein. The two-dimensional charge pattern which is formed on the surface of the photoconductor and which corresponds essentially to the spatial distribution of the X-ray intensity is scanned by an electrometer device in order to be converted into an electric signal. The electric signal is amplified, filtered, digitized and stored in a memory. It thus becomes available for digital image processing.

The photoconductor, preferably made of selenium, is normally a non-conductor. However, when it is exposed to X-rays its conductivity increases at the areas irradiated during exposure, so that at these areas the charge generated during a preceding charging operation is reduced, the reduction being greater as the intensity of the X-rays is higher and as the duration of the exposure of the photoconductor to the X-rays is longer, i.e. as the dose at the relevant area is higher. A substantial problem encountered in such an X-ray imaging system is caused by the fault areas in the photoconductor layer. At these fault areas local charge deficits occur, for example due to small conductive regions in the photoconductor material. Consequently, the X-ray image formed from the image values exhibits a corresponding number of dot-shaped artefacts. For a photoconductor having a surface area of 400 mm×400 mm, the number of such artefacts is approximately 100. Such artefacts are very annoying to the observer.

In the method described above these artefacts in the X-ray image are corrected by subtraction of a dark discharge image. This implies the use of a further image memory which has the same capacity as the image memory used for the actual X-ray image. Moreover, problems are encountered because the magnitude of the artefacts depends on the intensity of the X-rays, that is to say on the intensity during the relevant X-ray exposure as well as on the intensity during preceding X-rat exposures (memory effect).

The known method compensates for the dependency on the exposure intensity during the relevant X-ray exposure by means of a correction factor which depends on the dose and which must be determined in advance by means of a series of uniform X-ray exposures with a different dose. The memory effect, i.e. the dependency of the artefact amplitude on preceding exposures, is more pronounced as the distance in time interval between the relevant X-ray exposure and the preceding exposures is shorter. It can be taken into account only by regular updating of the dark discharge image, which would in extreme cases mean that after each exposure a new dark discharge image should be formed. Moreover, the memory effect can be compensated for only at the areas where the dose is very small or zero during the relevant X-ray exposure. Therefore, the known correction method is not exact.

It is the object of the present invention to provide a method and a device for performing the method in which the effect of the fault areas on the X-ray image is mitigated in a simpler manner. Based on a method of the kind set forth, this object is achieved in that first the position of the fault locations on the photoconductor is measured, the position of the fault locations and the variation of the artefacts caused thereby in the vicinity of the fault locations being stored, in that during subsequent X-ray exposures the amplitude of the artefact caused by the fault location is determined from the image values at the position of the fault location and at the edge of a zone surrounding the fault location, and in that the variation of the artefact in the X-ray image in the surrounding zone is calculated from the amplitude and the stored variation, the image values in this zone being corrected accordingly.

A device for performing this method, comprising an X-ray source, a photoconductor which can be exposed by means of the X-ray source, a charging device for charging the photoconductor, an electrometer device for measuring the charge density on the surface of the photoconductor and for forming image values as a function thereof, and also comprising a first memory for storing the image values of an X-ray image, is characterized in that there is provided a further memory for storing the position of the fault locations and the variation of the resultant artefact in a surrounding zone, an arithmetic unit being used for calculating the variation of the artefact in the X-ray image from the stored variation and from the amplitude of an artefact in the X-ray image, the image values within the surrounding zone being corrected accordingly.

The invention is based on the idea that the position of the fault locations and the variation of the artefact thus caused in the corresponding pixels and the pixel surrounding it are subject only to long-term variations and that they are notably not affected by the exposure of the photoconductor. The variation of the artefact caused by the same fault location in different X-ray images deviates only by a factor which depends on the amplitude of the artefact. Thus, once the position of a fault location and the variation of the resultant artefact have been determined (for example, by means of a dark discharge image) and stored, during the subsequent exposures it is merely necessary to multiply, for the relevant fault location, the stored variation by a factor which depends on the amplitude of the artefact in the X-ray image in order to obtain the variation of the artefact in the X-ray image. By addition of the variation thus determined to the image values of the X-ray image in the vicinity of the fault location, the artefact can thus be substantially elminated.

The variation of an artefact whose amplitude is known, can in principle be calculated. This is because the magnitude of the fault location in the photoconductor layer is usually smaller than the dimensions of a pixel that can still be resolved by the electrometer device. Consequently, the variation of the charge density or the surface potential, measured by means of the electrometer device, in the vicinity of the fault location does not represent the actual variation of the charge density or the potential on the surface of the photoconductor, but only the variation produced by the limited resolution of the electrometer device. This corresponds to the point spread junction which can be calculated from the parameters of the electrometer device.

The parameters which have an effect on the point spread function include the distance between the electrometer device and the surface of the photoconductor. When this distance is not exactly known or subject to variation, exact calculation of the artefact variation is not possible. Therefore, in a further version in accordance with the invention the artefact variation to be stored is measured in a dark discharge image.

This further version is suitable for devices in which the photoconductor is arranged on the circumference of a rotatable cylinder and in which the cylinder is rotated for the measurement of the charge density on the surface, the electrometer device being displaced only in the direction of the cylinder axis. Should the cylinder device be slightly unbalanced, the distance will change periodically, be it in a reproducible manner, so that the calculation of the artefact variation is difficult, but measurement is simple.

Figure 2A:
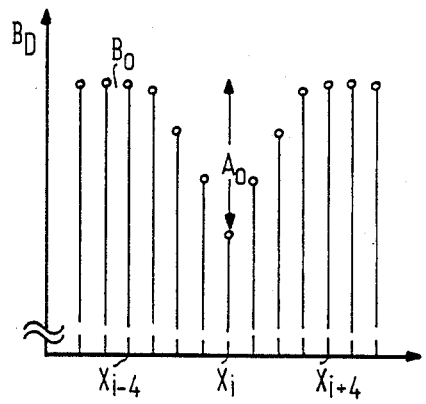
Figure 2B:
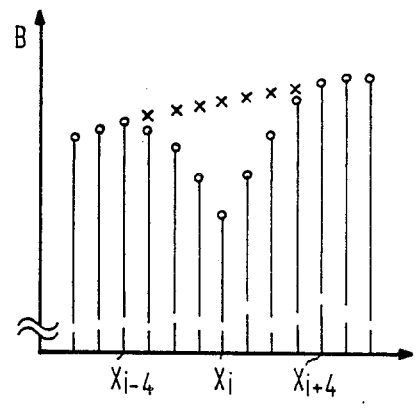
Figure 2C:
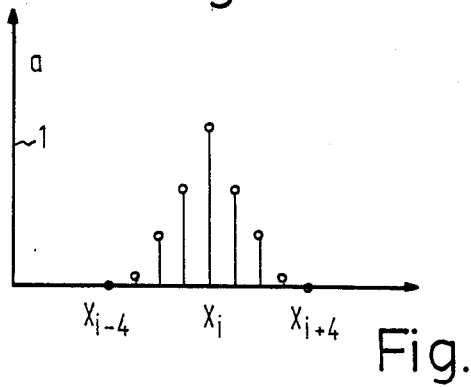
Figure 3:
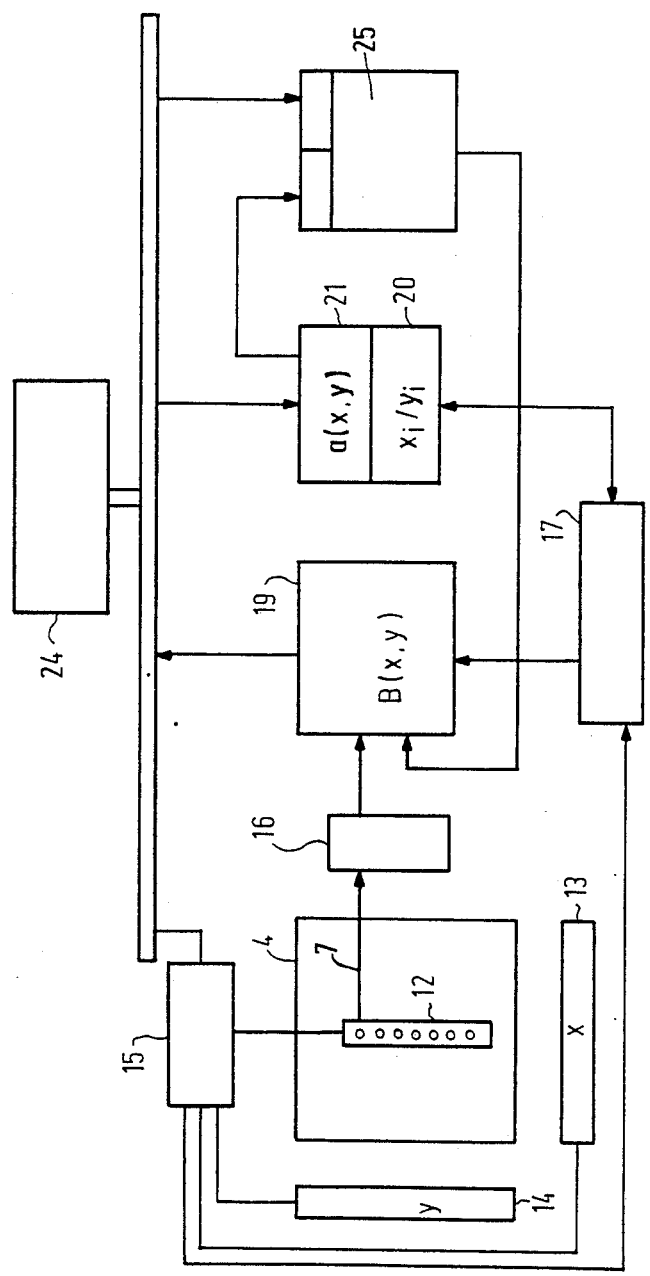

The invention will be described in detail hereinafter with reference to the drawing. Therein;

FIG. 1 shows an X-ray imaging device in which the invention can be used,

FIGS. 2a and b show the surface potential profile, measured in a dark discharge image and an X-ray image, respectively, along a straight line on which a fault location is situated, FIG. 2c shows the artefact variation parameters to be derived therefrom, and FIG. 3 shows the block diagram of a device in which this method can be carried out.

The reference numeral 1 in FIG. 1 diagrammatically denotes an X-ray source which emits a fan-shaped radiation beam 2 which irradiates an object 3 to be examined, for example the body of a patient, and which produces a charge pattern which depends on the radiation intensity on a photoconductor 4 which is arranged behind the object. The photoconductor 4 preferably consists of a layer of selenium having a thickness of 0.5 mm which is provided on an aluminium electrode 5.

Prior to the actual X-ray exposure, the photoconductor is charged to a potential of, for example $-1750$ V (with respect to the aluminium electrode 5) by means of a diagrammatically indicated corona discharge device 6. The subsequent X-ray exposure, during which the corona discharge device need no longer be situated between the radiation source and the photoconductor, the photoconductor surface is discharged more or less, depending on the intensity of the X-rays. The charge pattern thus produced is scanned and digitized by means of an electrometer device (not shown), thus producing image values which correspond to the surface potential or the charge density in a pixel defined by the resolution of the electrometer device. The fault locations produce a minimum value of the surface potential or the charge density in the pixel in which they are situated. The charge density is also reduced in the neighbouring pixels. The zone influenced by the artefact will be smaller and the artefact amplitude will be higher as the resolution of the electrometer device is higher.

FIG. 2a illustrates such an artefact in a dark discharge image; for a straight line which extends in the X-direction and on which there is situated a fault location the image values $B_D$ (representing the charge density or the potential on the surface) are shown as a function of the location coordinate x. It appears that the image value at the area $x_i$ is a minimum and that the image values in the vicinity of this fault location are also smaller, i.e. increasingly smaller as they are situated nearer to the fault location. At a given distance from the fault location $x_i$, the resultant artefact is no longer noticeable; in the present example this is the case for the pixels at the locations $x_{i-4}$ and $x_{i+4}$. In these pixels as well as in pixels which are situated further away the image value is constant and amounts to $B_O$. The amplitude $A_O$ of the artefact in the dark discharge image corresponds to the difference between $B_O$ and the image value at the location $x_i$ in the dark discharge image.

The other fault locations in the photoconductor cause similar artefacts, but their amplitude may be higher or lower. Moreover, the fault location may occupy a different position with respect to the pixel in which it is situated, so that a non-symmetrical variation occurs instead of the symmetrical variation shown in FIG. 2a.

FIG. 2b shows the variation of the image values $B(x, y)$ in an X-ray image at the fault location and in its vicinity. The artefact again reaches its highest amplitude at the location $x_i$, which amplitude decreases towards the extremities. The amplitude, however, may deviate from that in the dark discharge image. It depends on the intensity of the X-rays during the relevant exposure and possibly on the intensity of the X-rays in the relevant location during an X-ray exposure made briefly before that.

FIG. 3 shows the block diagram of an X-ray imaging device which is capable of eliminating the described artefacts. The surface of the photoconductor 4 is sensed by means of an electrometer device 12 which comprises a number of electrometer or influence probes, each of which detects the charge density or the surface potential in one pixel. Suitable electrometer devices are described inter alia in DE-OS 29 48 660 and in DE-OS 35 05 615. In order to ensure that the surface potential of all pixels on the record carrier can be measured, the electrometer device must be displaced in two mutually perpendicular (x, y) directions relative to the photoconductor 4. To this end there is provided a programmable scan control system 15 which itself is controlled by a suitable process computer or a host computer 24. The relevant position of the electrometer device is signalled to the scan control system 15 by the x-y position generators 14, 13 respectively.

The electrometer device 12 may comprise a subsequent amplifier and a sample and hold circuit for each electrometer probe, the output signals thereof being applied to the input of a digital-to-analog converter 16 via an analog multiplexer (not shown) and a lead 7. This converter converts the analog input values of the surface potential or the charge density of a surface in the individual pixels into digital data words having a word width of 16 bits. The strobe signals for the analog-to-digital converter 16 can be generated by the x position generator 13 (when the electrometer device scans the photoconductor in a meander-like fashion in lines extending in the x direction). The digital data words thus formed are applied to an image memory 19. For a typical pixel size of 0.2 mm $\times$ 0.2 mm and a photoconductor surface of 400 mm $\times$ 400 mm, this image memory must have a capacity of at least 4 million data words of 16 bits each. An address generator 17 stores the data words supplied by the analog-to-digital converter at an address which is formed by the coordinates x, y associated with the relevant pixel and supplied by the scan control system 15.

The host computer 24 controls the device as follows: first a dark discharge image is made, i.e. the surface of the photoconductor 4 is uniformly charged and the surface potential is measured by means of the electrometer device 12, without the photoconductor 4 being exposed to X-rays. The resultant image values $B_D(x, y)$ for the individual pixels in this discharge image, corresponding to the surface potential, are stored in the memory 20. The image values are successively read by the host computer 24 and the dark discharge image is examined for artefacts. This is performed in that the computer 24 detects, on the basis of a suitable algorithm, local minimum values in the dark discharge image which are below a predetermined threshold value, and stores the associated pixel coordinates $x_i$, $y_i$ in an auxiliary memory 20 The stored pixel coordinates indicate the position of a fault location. Subsequently, for each fault location thus detected (a photoconductor may comprise as many as 100 fault locations) a preferably square surrounding zone is defined which contains all pixels whose coordinates satisfy the conditions $$x_i - n \leq x \leq x_{i+n} \quad (1)$$

$$y_i - n \leq y \leq y_{i+n} \quad (2)$$

Therein, the value n is chosen so that the image values at the pixels defined by the inequalities (1) and (2) are more or less influenced by the fault location, while at the (outer) edge of this zone, i.e. at the pixels which are situated one pixel width or more further away, the fault location no longer has any effect. In the example shown in FIG. 2a, n=4 would be a suitable value and there are $(2n+1)^2$ pixels (including the pixel characterizing the fault location) satsifying the conditions (1) and (2).

The image values at the pixels defined by the inequalities (1) and (2) are converted into standardized artefact values $a(x, y)$ in the computer 24 in accordance with the relation $$a(x,y) = (B_o - B_d(x,y))/A_o \quad (3)$$

The standardized artefact values have the value 1 at their centre and a value substantially equal to zero at their edges. These values, whose variation at the fault location $x_i$ and their vicinity is shown in FIG. 2c, are stored in the auxiliary memory 21. This is repeated for all fault locations. Following this preparation, the following process takes place after each X-ray exposure in order to reduce the artefacts: the photoconductor is scanned and the image values B(x, y) are stored in the image memory 19. Using the list of coordinates stored in the auxiliary memory 20, the image values at the fault location and at the edge of the zone defined by the non-equalities 1 and 2 are fetched and the artefact amplitude $A(x_i, y_i)$ in the X-ray image is calculated in accordance with the equation $$A(x_i,y_i) = B(x_i,y_i) - 0.5(B(s_{i-n},y_i) + B(x_{i+n},y_i)) \quad (4)$$

Thus, the artefact amplitude is calculated from the difference between the image value $B(x_i, y_i)$ at the fault location and the arithmetical mean value of two pixels which are situated at the edge of the surrounding zone as well as on the straight line $y=y_i$. However, it is alternatively possible to calculate the mean value from more than two pixels at the edge of the surrounding zone.

Thus, the relevant artefact amplitude is calculated for all fault locations whose coordinates are stored in the memory 21.

Subsequent to this calculation of the artefact amplitudes which are valid only for the relevant X-ray image, the address generator 17 fetches from the memory 21 the variation $a(x_i, y_1)$ of each artefact in the surrounding zone of the fault location. Each image value B(x, y) in such a surrounding zone is corrected in that the stored variation a(x, y) is multiplied by the artefact amplitude calculated in accordance with the equation (4), the product being added to the relevant image value in accordance with the formula $$B'(x,y) = B(x,y) + a(x,y).A(x_i,y_i) \quad (5)$$

The corrected image value B'(x, y) replaces the non-corrected image value B(x, y) in the image memory 19. The resultant variation of the image values in the vicinity of $x_i$ is denoted by crosses in FIG. 2b.

This simple calculation can be performed as indicated in FIG. 3 by means of a computer 25. Alternatively, this calculation can also be performed by the host computer 1, because the number of operations required is in the order of 100,000 per image, so no special requirements are imposed as regards the computer speed, assuming that the correction calculation is performed within one second.

The magnitude of the surrounding zones, the value n in the inequalities (1) and (2), can be chosen to be equal for all fault locations. However, it is alternatively possible to select the magnitude of the surrounding zone in dependence of the amplitude $A_o$ of the artefact in the dark discharge image so that the surrounding zone is larger as the amplitude $A_o$ is higher.

The invention has been described above in conjunction with a flat photoconductor 4. However, it can also be used in a device comprising a photoconductor arranged on a rotating cylindrical surface. Such a device is known from DE-OS 35 34 768. Preferably, the artefact variation a(x, y) (FIG. 2c) is then also measured on the basis of the dark discharge image. This is because for a slight unbalance of the cylinder carrying the photoconductor the distance between the photoconductor and the electrometer device changes, and hence the variation of the artefact also changes periodically but in a reproducible manner, so that calculation of the artefact variation is very difficult.

We claim:

1. A method of producing an X-ray image by means of a photoconductor comprising a plurality of pixels, which converts X-rays into a charge pattern at each pixel, which is uniformly charged prior to X-ray exposure and is discharged during the X-ray exposure as a function of the intensity of the X-rays, said discharged photoconductor tending to exhibit faults at one or more pixel locations, said faults causing artefacts in said image, said artefacts having an amplitude (A ($x_i$, $y_i$), said amplitude tending to vary in value in zones surrounding a fault, the photoconductor surface being scanned in order to determine the charge density at said pixels, for each pixel there being formed an image value which depends on the discharge at the corresponding pixel, said method characterized in measuring the positions ($x_i$, $y_i$) of the one or more fault locations on the photoconductor, storing the positions of the fault locations and the variation (a($x_i,y$)) of the artefacts caused by the faults in surrounding zones of the faults, determining from image values at the position of the fault locations ($B(x_i, y_i)$) and at the positions surrounding the fault locations ($B(x, y)$) during subsequent X-ray exposures the amplitude ($A(x_i, y_i)$) of the artefacts at a fault location calculating the variation of the artefacts in the X-ray image in the surrounding zones from the amplitude ($A(x_i, y_i)$) and the stored variation ($a(x, y)$), and correcting the image values in the surrounding zones based upon said calculated variation.

2. A method as claimed in claim 1, characterized in measuring in a dark discharge image the artefact variation ($a(x, y)$) to be stored.

3. A device comprising an X-ray source, a photoconductor surface which is positioned to be exposed by X-rays from the X-ray source, a charging device for charging the photoconductor, an electrometer device for measuring the charge density on the surface of the photoconductor and for forming image values as a function of the charge density, and a first memory for storing the image values of an X-ray image, said device further comprising: a further memory for storing the position of fault locations and the variation of resultant artefacts in a zone surrounding said fault locations, an arithmetic unit for calculating the variation of the resultant artefacts in the X-ray image from the stored variation ($a(x, y)$) and from the amplitude ($A(x_i, y_i)$) of an artefact in the X-ray image, and means for correcting the image values ($B(x, y)$) within the surrounding zone based upon said calculated variation of the resultant artefacts.

* * * * *